United States Patent [19]
Bates et al.

[11] Patent Number: 5,613,097
[45] Date of Patent: Mar. 18, 1997

[54] METHOD OF CATALOGING REMOVABLE MEDIA ON A COMPUTER

[75] Inventors: Roger D. Bates, Aloha, Oreg.; Scott R. Ketterer, 6781 SE. 68th Ct., Hillsboro, Oreg. 97123; John Bridgman, Scarborough, Canada

[73] Assignee: Scott R. Ketterer, Hillsboro, Oreg.

[21] Appl. No.: 342,929

[22] Filed: Nov. 18, 1994

[51] Int. Cl.$^6$ .................................................. G06F 3/00
[52] U.S. Cl. ........................ 395/500; 395/404; 395/281; 395/602; 364/DIG. 1; 364/DIG. 2
[58] Field of Search .................................. 395/500, 600, 395/182.18, 488, 700, 726, 650, 441, 444, 843, 419, 404, 438, 309, 281, 439, 481, 550, 463, 412, 497.01; 364/DIG. 1, DIG. 2

[56] References Cited

U.S. PATENT DOCUMENTS

| | | | |
|---|---|---|---|
| 4,408,273 | 10/1983 | Plow | 395/600 |
| 4,688,169 | 8/1987 | Joshi | 364/DIG. 1 |
| 4,799,145 | 1/1989 | Goss et al. | 395/700 |
| 4,897,780 | 1/1990 | Lakness | 395/600 |
| 4,897,782 | 1/1990 | Bennett et al. | 395/600 |
| 5,077,658 | 12/1991 | Bendert et al. | 395/600 |
| 5,317,728 | 5/1994 | Tevis et al. | 395/600 |
| 5,319,780 | 6/1994 | Catino et al. | 395/600 |
| 5,325,533 | 6/1994 | McInerney et al. | 395/700 |
| 5,337,197 | 8/1994 | Brown et al. | 395/404 |
| 5,361,358 | 11/1994 | Cox et al. | 395/700 |
| 5,386,545 | 1/1995 | Gombos, Jr. et al. | 395/700 |
| 5,423,018 | 6/1995 | Dang et al. | 395/600 |
| 5,455,926 | 10/1995 | Keele et al. | 395/404 |
| 5,463,772 | 10/1995 | Thompson et al. | 395/600 |

*Primary Examiner*—Kevin J. Teska
*Assistant Examiner*—Jacques Louis-Jacques
*Attorney, Agent, or Firm*—Keith A. Cushing

[57] ABSTRACT

A method of automatic and user intuitive cataloging of removable media on a computer. The method does not require the user to launch an application to catalog because it operates within the existing system software and does not require a user to learn to operate a separate cataloging program. This applies to cataloging as well as searching entries. The method presents the data in the catalog in the same way that actual files on the computers hard disk or start up volume are presented. The method includes modifying and/or creating pointer files so that when activated it can remember where the original file is located, even when the file is on a volume that is not accessible to the computer when the pointer file is activated. The pointer file created by this method can be resolved when accessed through the operating system interface or from within an application, just like actual files.

1 Claim, 5 Drawing Sheets

5,613,097

METHOD OF CATALOGING REMOVABLE MEDIA ON A COMPUTER

TECHNICAL FIELD

The present invention relates generally to information storage and retrieval, and particularly to a method of cataloging and accessing files that may not be directly accessible to a computer at all times.

BACKGROUND OF THE INVENTION

FIG. 1 shows a typical computer configuration. The basic computer is comprised of electronics 1, display 2 and keyboard 3. The electronics component will typically contain storage devices, such as hard drive 4, floppy drive 6, and optional cartridge drive 8, and other similar storage devices.

These computers use a variety of electronic storage media like hard disks 4, floppy disks 7, cartridge disks 9, tapes, CD's and more. Typically a user will have a primary drive 4 from which the computer boots. A "Boot" volume will have a form of system code stored on it which gives the computer critical information that the computer needs to operate. In most cases the system code is located on hard disk 4 that is kept with the computer along with other important files and applications the user wants immediate access to.

Consumers have a wide variety of choices for storing files on other media. Often additional storage space is needed for additional files, arching old files or backing up the software from their primary disk. These forms include non removable type media like other hard disks and networked volumes or removable media like floppies, cartridges, tapes and CD's. With removable media, the user has many removable disks or cartridges. Only one such disk can be inserted and be on-line at any given time. The remaining disks are all off-line and thus not directly accessible to the computer. With the typical users' storage space requirements increasing, people need to use cataloging programs on their computer to help keep track the location files on various forms of removable media.

Traditional methods for tracking files located off the main volume of a computer has been to obtain a stand-alone cataloging program. First one launches the program and sets up the catalog format. Then each piece of off-line media is cataloged one at a time. When the cataloging is complete the the user exits the program.

To search the entries in the catalog one launches the cataloging program and starts the search. Once the desired file is located, the user notes the location and quits the program. The user locates and inserts the proper disk into the computer. Once attached the user finds the file and loads it. With this traditional method of cataloging, a user must be familiar with the cataloging program and the interface in which the entries in the catalog are kept. Because the cataloging programing is a separate program, it has an interface with commands that are different from the computer's operating system and there is a learning curve associated with using it. Most people require a more convenient mechanism for finding and accessing off-line material.

With the traditional method of cataloging the catalog is only as current as the last time the program was launched and all media recataloged manually. A user must dedicate a certain amount of time periodically to maintain the catalog.

It is desirable, therefore, that off-line cataloging be more convenient and operate in transparent fashion for the user with little or no direct interaction between the use and the cataloging program. The subject matter of the present invention provides such a cataloging function.

SUMMARY OF THE INVENTION

Cataloging under the present invention is performed in an automatic way whenever a particular computer storage device is removed from the computer and requires almost no specific action by the operator (user). Likewise, the catalog of all files that have been removed is stored in a manor that allows the user to search the catalog in a way identical to that which would be used if the files are already directly accessible, and in fact all files, on-line and cataloged, can be searched with a single operation.

An object of the present invention is, therefore, to provide a method of cataloging off-line media that, other than the initial configuration, requires no action by the user. Volumes other than the primary volume are automatically cataloged or updated when encountered by the computer.

Another object of this invention is the method of implementing pointer files that use minimal space in the catalog, yet appear to the system to be standard pointer files that take up much more room.

Another object of this invention is the method of creating pointer files for applications so that any document that might resolve to that pointer files original application can be accessed though that pointer file.

Another object of the invention is to assign a unique number to each new volume cataloged by the program that will identify that volume to the catalog even if the contents and/or name have been changed since the last encounter. That number corresponds to a similarly numbered sticker that may be placed on the physical media.

A further object of this invention is the method to have the catalog always available to the user on the desktop in the form of a completely separate volume. There is no need to launch an application to have access to the catalog. The entries in this volume graphically look and act like entries on any other volume including the "boot" volume. However these entries are pointer files that, when accessed, automatically result in access to the appropriate off-line files.

DETAILED DESCRIPTION OF PREFERRED EMBODIMENT

The description used in this disclosure will provide details of implementation using the Macintosh™ computing platform. The function, however, is not limited to that platform.

The present invention includes a method of cataloging off-line media that is automatic to the user. To accomplish this without the user explicitly running an application the system is modified at start up with the code necessary to have the computer catalog or recatalog volumes as encountered.

A file is provided, called an 'INIT' that is automatically executed by the operating system each time the Macintosh™ computer is started. This file contains code that will utilize standard system procedures to install pointers to small pieces of computer code that are to be executed whenever a particular system "function" is executed in order to modify the behavior of that function. Using the system functions "GetTrapAddress" and "SetTrapAddress", the INIT code modifies the system functions "amount", "Open", and "GetIndResource" such that the the enhanced cataloging and retrieval operations of the present invention can be performed in a fully automatic manner. The particular modifications to these functions will be described later. These system modifications are necessary to allow performance of the computer system to be modified in a way that does not require any specific action by the user.

Once installed, the system operating under the present invention will automatically catalog any volume the computer comes in contact with. When the disk or media is removed, an "Unmount" function is executed by the system which, under the present invention, in turn causes cataloging to take place automatically.

Figure 1:
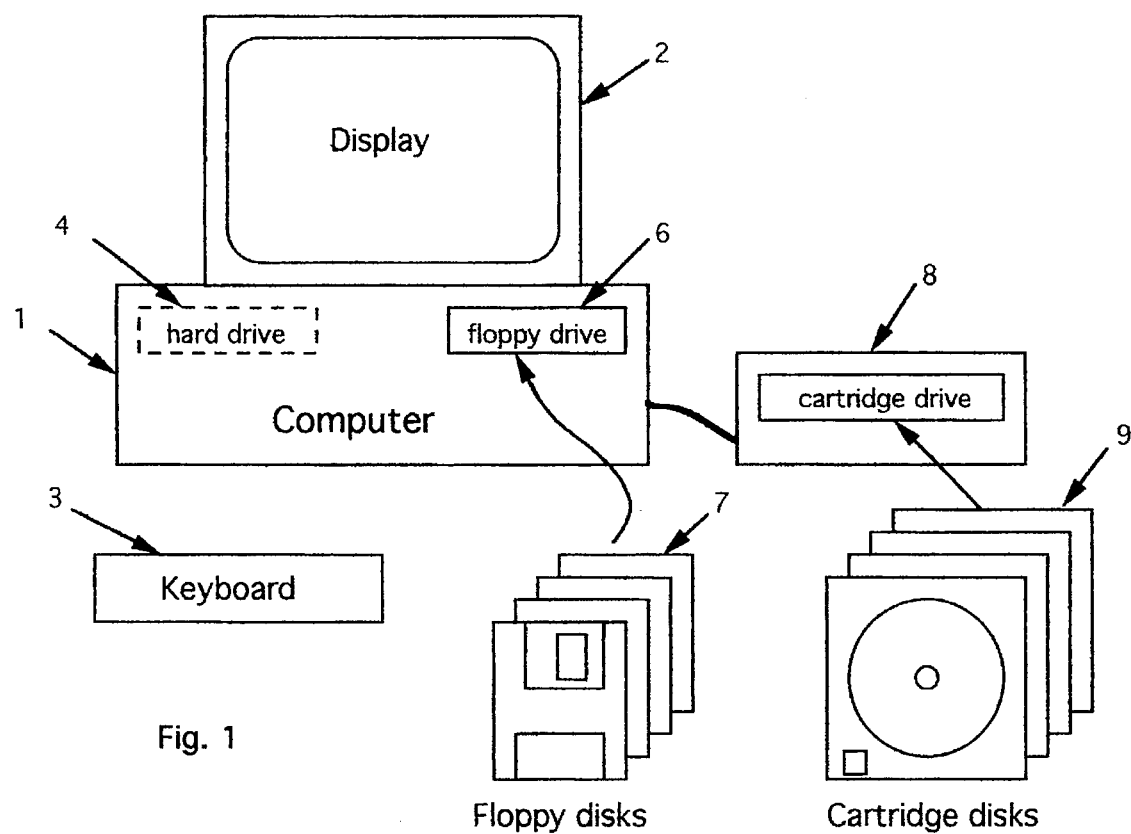
FIG. 1 is a system computer configuration showing some of the possible forms of storage devices.
Figure 2:
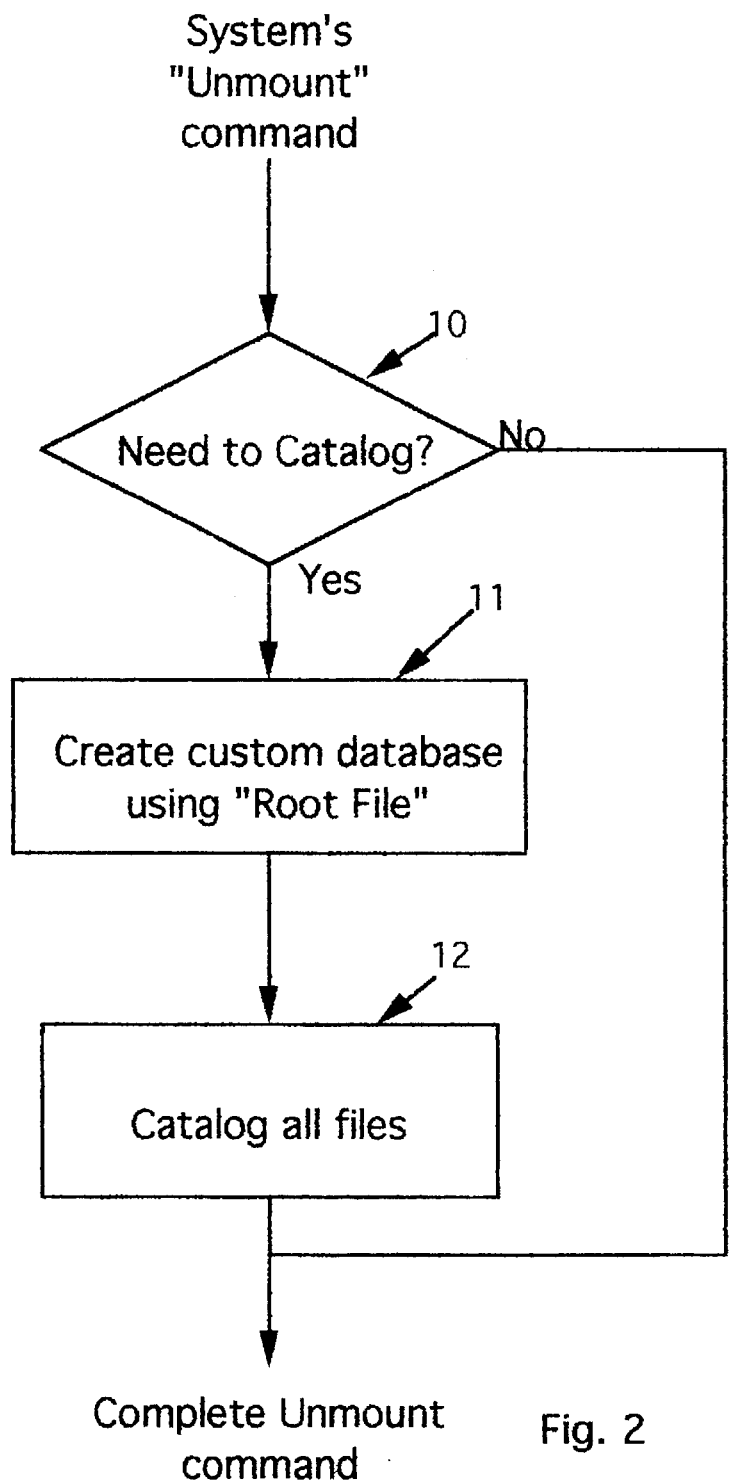
FIG. 2 is a system level flow diagram showing the operations that take place when a disk or other media are unmounted or removed from the computer.

FIG. 2 shows the overall sequence of actions whenever a disk, or media, is removed from the computer system. A more detailed description will be given later in conjunction with FIG. 4. The system function "Unmount" has been modified, by the startup code to cause additional program cycle to be executed automatically. The code in block 10 first determines if the particular disk or media needs to be cataloged. This is determined by the type of media being unmounted, determining if it has been cataloged before, and, if so, whether the contents of the disk has changed. At this point, a dialog window may be presented to the user allowing for input from the user to set catalog options, assign a unique catalog number, and confirm whether to catalog the media or not. If cataloging is required, then block 11 updates a custom data base with information about the media about to be unmounted, a new folder (directory) is created in the catalog volume, and block 12 adds empty files to the catalog volume that correspond to each file that exists on the :media about to be unmounted.

In a typical computer operating system with a graphical user interface like Microsoft™ Windows 95™ or the Apple™Macintosh™System7™, graphical elements are used to represent files and applications. These graphically oriented operating systems include the ability to create pointer files. A pointer file is a empty graphical representation of an actual file or program. For example on the Macintosh™ operating system one places a particular application inside a folder(directory) which is inside a folder and that folder is located at the upper most level of the graphical user interface. One may wish to launch (execute) the application from a variety of locations in other parts of the interface. System 7 allows the operator to create a pointer file called an "alias". One places an alias, which is a representation of the original application, on the desktop or in another folder without moving the actual original file from its folder.

Cataloging under the present invention automatically creates a collection of pointer files. One browses through or searches the catalog in the same manner used to search through any other on-line volume. Because the catalog is made up of pointer files however it takes up very little space. Catalog entries are accessible at all times because the catalog is a collection of standard files created within a mounted volume.

Using existing system capabilities, opening a pointer file causes the operating system to search for the original file. If the original file is on-line then the system opens it. If the pointer references an off-line file then the system prompts the use to insert the appropriately named disk. In the present invention, a unique number is also used to identify the required disk. Once the disk is inserted the system locates the original file and opens it.

Standard pointer files, though much smaller than the actual files they represent, take up memory on the volume on which they are located. They contain a Macintosh™ data structure called an 'alias', which is comprised of volume name, creation date, file name, creation date, and location. The size of these pointer files make it impractical to use tens of thousands of them to build an extensive catalog. The method of the present invention, however, builds a pointer file containing no data bytes whatsoever, only requiring the file system entry, making it possible to have hundreds of thousands of such entries in a single catalog volume. In this embodiment, common information such as volume name and creation data are stored once for each volume cataloged, not one for every file cataloged.

Figure 3:
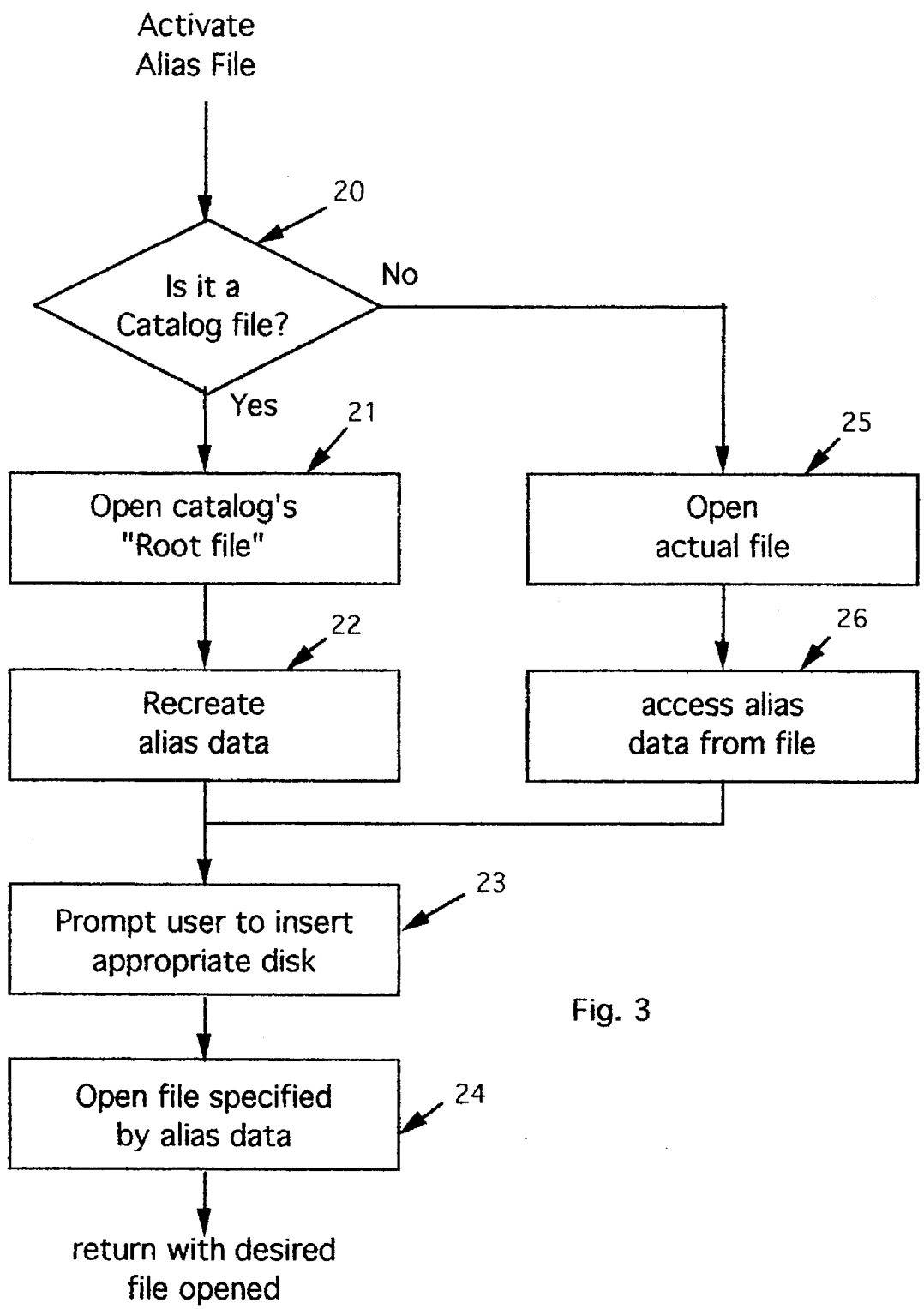
FIG. 3 is a system level flow chart showing what operations take place whenever an "alias", or pointer, file is activated.

FIG. 3 is an overview of the normal operation of accessing a pointer (alias) file. Full details of the modified system behavior is covered in FIGS. 5 and 6 which follow. Block 20 determines if the pointer file being opened is a catalog entry. This is indicated if the file being opened is within the catalog volume, the file is of type alias, and it does not already contain an alias data structure. If it is not, the normal system functions, as represented by blocks 25 and 26, are performed. If the file is a catalog file, then a template file, or "Root File" is opened by block 21. Next the appropriate alias data structure is created by combining the contents of the Root File with the catalogs file name, etc. in block 22. Normal system functions, represented by blocks 23 and 24, are performed. If the alias refers to an off-line file, then block 23 is activated to prompt the user to insert the appropriate disk. Finally, with the appropriate disk inserted, block 24 opens the requested file.

Applications in today's GUIs(Graphical User Interface) have special attributes to control their behavior. If a document is opened, the operating system must find and open the application that created it. The information specifying the type of creator application is included in the document itself. The operating system then finds the appropriate application, launches it and loads the document that was opened. If an application is saved or cataloged as an alias, then the system will not be capable of recognizing the alias file as a pointer to the documents creator, thus the system will be unable to locate the application and the open document command will fail. In the present invention, however, the application files are cataloged as zero byte applications. The system will now be able to find and open the catalog application, which in turn results in the original application being loaded from the off-line media and the selected document file being opened. For example, if a document was opened and its program is not available on the main drive, the catalog volume may contain a entry for the application. The operating system will open (launch) the cataloged application, which will in turn prompt the user for the disk containing the needed program, and finally launch the actual program on the inserted disk.

It is common for disks, especially removable media to be used on several computers. This method includes the ability to track and or recognize disks when they are reinserted into the same computer. This is important because the cataloging program needs to know which disks are new, which need to be updated and which haven't changed. To accomplish this, a unique number is assigned to each disk cataloged. By providing pre-printed stickers, the user is encouraged to number his physical disks as a further aid in locating and inserting the proper disk when needed. This number is stored on the disk itself and in the catalog data base. In addition, the count of files and folders on the disk are saved and compared that allow the catalog code to determine if a disk has been modified since last cataloged.

Existing catalog programs store lists of cataloged files in proprietary data bases, requiring a separate application to be run to access the data base. The user is forced to use one command to search the on-line files, then enter an application and issue a different command to search the catalog data base. In the present invention, however, the catalog is a standard mounted volume or file system and is thus available to the operating system at all times. This has the advantage of always being available to the user without leaving to run a separate application. The interface is not only immediately familiar, but a single command can be used so search both the on-line files, but also the cataloged files. In addition, under the present invention, the catalog volume like any other volume can be shared over a computer network, thus making the catalog easily accessible to other users on the computer network.

Figure 4:
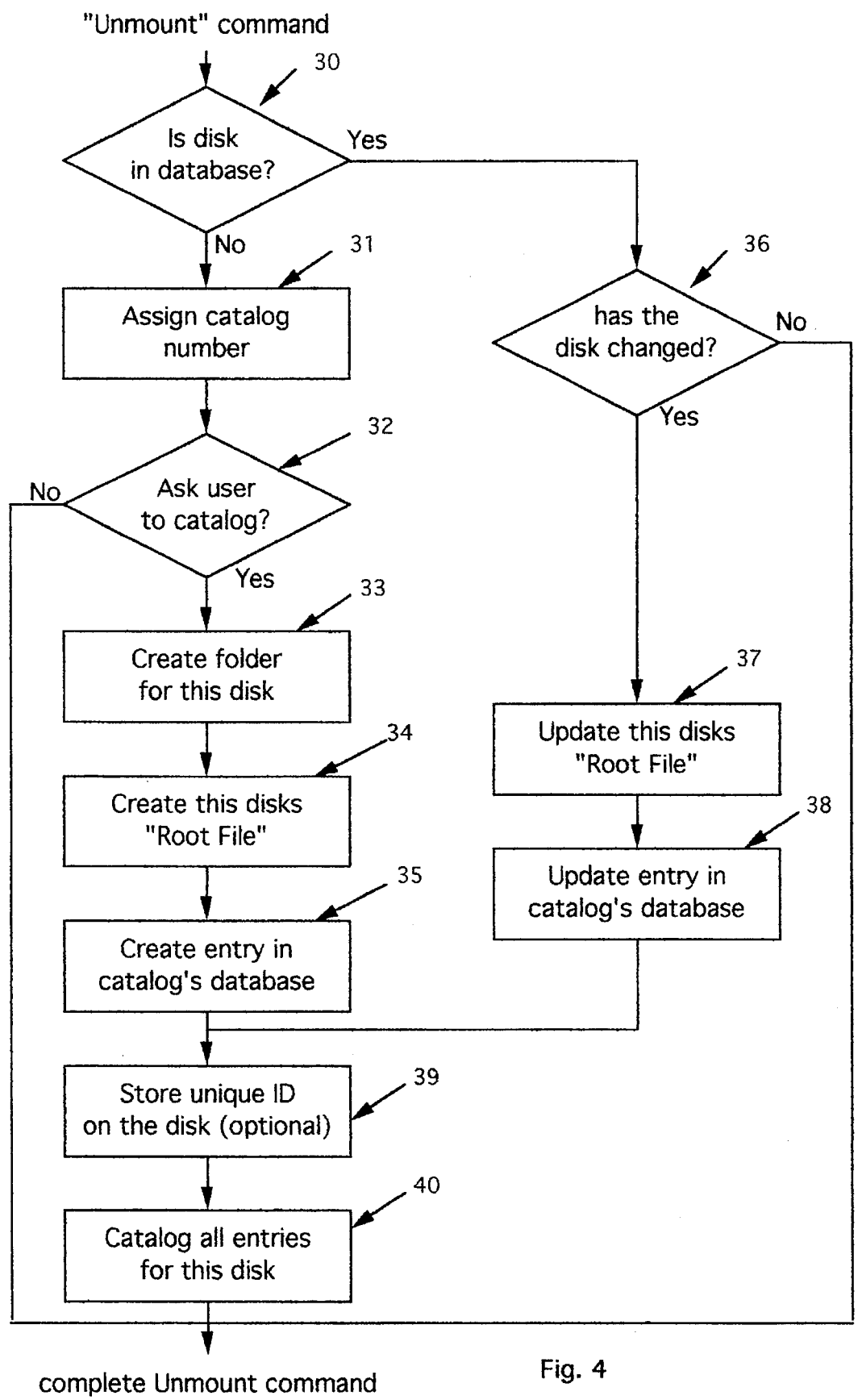
FIG. 4 is a detailed flow diagram showing the operations that take place when a disk or media are unmounted or removed from the computer.

FIG. 4 is a flow diagram showing the detailed operations that takes place when a disk or media are unmounted or removed from the computer. This is an expansion of the operation as summarized by FIG. 2. The normal operation of Unmount is modified allowing the cataloging code to execute.

This code first determines if the cataloging function is required, and if so performs that operation. Block 30 first determines if the disk is already in the catalog's data base. The data base is a single invisible file in the catalog that contains the name, creation date, catalog number, and catalog folder number for each piece of media currently entered in the catalog volume.

If the media does not match any entry in the data base, then block 31 assigns a unique catalog number to that disk. If the disk is not in the data base, but has been cataloged before, as indicated by a unique number already stored on the disk, then that number is used, even if the number is not unique. Block 32 presents a dialog window to the user in order to allow the user to make a choice whether to catalog the disk or not. At this point the user may change the name of the disk, change the assigned unique disk ID, and change the cataloging options to be used for that disk.

Cataloging options relate to the amount of graphical information (icons) that is cataloged for each file. Cataloging with no graphical information allows all catalog files to be 0 bytes in size, but the visual presentation on the screen may not match the original file. Cataloging all graphical information from the original file into the catalog will result in complete visual presentation but will cause the catalog file size of some files to become 1024 bytes to over 20,000 bytes for some applications. The options available to the user include cataloging custom icons for applications, custom icons for all files, and whether to catalog black/white or color icons. The implementation of cataloging graphical information involves copying the required icon resources ('ICN#', 'ics#', 'icl4', and 'ics4',) from the original to the catalog file.

If the user chooses to catalog, then a sequence of operations is performed to complete the cataloging. Block 33 creates a folder(directory) entry (using "DirCreate") in the catalog volume, giving it the same name as the volume or media being unmounted. Block 34 adds a file within the folder that is invisible to the user. This file, named 'icon', will contain information about the media being cataloged. This information comprises of the custom graphical icon to depict the class of media (floppy disk, cartridge disk, CompactDisk, etc.) that is being cataloged, an "alias" data structure necessary to allow the computer system to locate and verify the media being cataloged, and program code for use by cataloged applications. The alias data is created via the "NewAlias" system function to create such a structure for the media being cataloged. Block 35 creates an entry in the catalog volume data base and stores the disk's name, creation date, catalog number, current file count, next file id, and folder id for folder created by block 33.

If block 30 determines that the disk has already been cataloged, then block 36 determines if any changes have been made to the disk since last cataloged. Disk changes are determined by comparing the file count (pb.volumeParam.ioVFilCnt) and next file id numbers (pb.volumeParam.ioVNxtCNID) currently in the disk to those numbers stored in the catalog's data base file. If the two numbers are identical, then no cataloging is required and the execution may exit and the Unmount function may complete. If the numbers are different, then files or folders have been added or removed and the catalog entry needs to be updated. Block 37 and 38 update the Root File and the catalogs data base respectively.

Next, whether new or updating, block 39 stores the disks unique id on the disk in a location that is not used by any other Macintosh™ functions. This location corresponds to unused bytes following the disk volume header data structure. The disk ID is stored in conjunction with a verifying unique code, and is stored in two separate locations for redundancy. It is deemed unlikely that other programs will utilize both these two locations, but if so, the cataloging functions are designed to rely on disk name and creation date if neither codes are present. Future cataloging of this disk can not require the presence of the disk ID, since the disk being cataloged may be "write protected", thus preventing the placement of this code on the disk. In this case the cataloging function will have to rely on the disk name and creation date to determine if it has been cataloged before.

Finally, block 40 performs the actual cataloging. At this point, for each folder(or directory) on the disk being cataloged, a corresponding folder in the catalog is created (using "NewDir"). For each file on the disk being cataloged, a corresponding file is created in the catalog volume (using "Create"). Numbers used to determine the viewing mode (the way the file(s) are presented to the user) are maintained so the visual presentation of the catalog matches as close a possible to the disk being cataloged. This is achieved by using the "GetCatInfo" and "SetCatInfo" commands to copy the contents of the "pb.hFileInfo.ioFlFndrInfo" and "pb.hFileInfo.ioFlXFndrInfo" data fields from the Unmount file to the catalog file. Each file created in the catalog is a pointer or "Alias" type file. That is to signify that it is not the actual file, but a pointer to that, possibly removed, file.

In the normal implementation of the Macintosh™ file system, an alias file contains a data structure called an "alias" which contains all information necessary to properly prompt the user for the disk, and to locate the file within the disk once inserted. Under the present invention, however, in order to save space, the individual file entries within the catalog to not contain this alias data. The information stored within an alias structure that relates to the volume name and volume creation date is identical for every file cataloged from a single disk. Because of this, a single "template" alias structure is stored with the Root File. The one unique number, the file id (pb.hFilelnfo.ioDirID) of the file being cataloged, is stored within the catalog's file directory entry normally used to store the "last backup date" (pb.hFileInfo.ioFlBkDat). This backup date is not needed for the catalog entries. This means that no information needs to be stored within the file itself, thus the file size is zero.

When the user searches the catalog volume and locates a file and asks to access that file, a sequence of steps take place under the present invention that result in the appropriate alias data structure being created so that the appropriate disk and file are accessed. This is a two step operation, where the catalog file is first opened and then the alias data is requested from within that open file.

Figure 5:
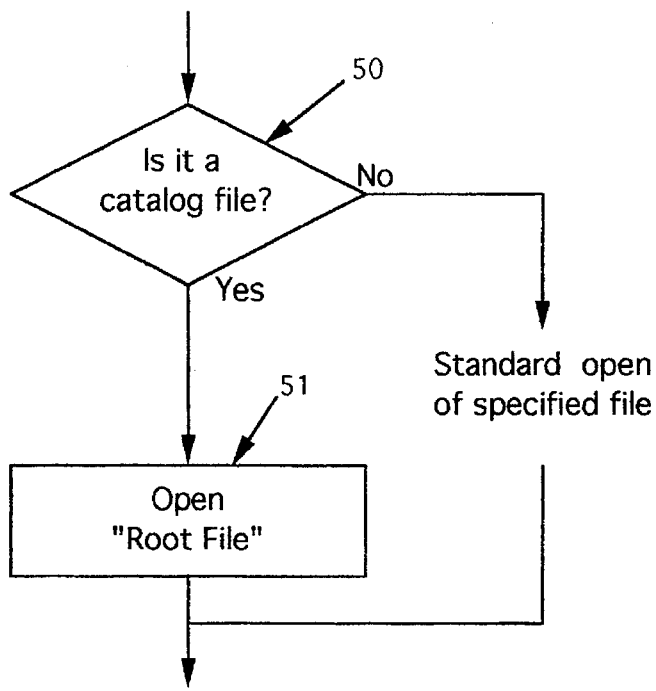
FIG. 5 is a flow diagram showing the operations that take place when a file is opened.

FIG. 5 shows the steps that take place whenever a file is opened. The normal operation of "open" is modified allowing catalog code to execute. Block 50 first determines if the file being opened is a zero byte file within the catalog volume. If it is not, then the code exits allowing the normal file open function to complete. If the file is a catalog file, then a search is made to locate the "Root File" within the folder that holds the file being opened. The "root file" is then opened in place of the actual file being opened. The root file contains an alias data structure that matches the original media cataloged. The file name and the "last backup date" information is stored for future reference. They will be needed when the system attempts to access the alias structure (a "resource") from the opened alias file.

Figure 6:
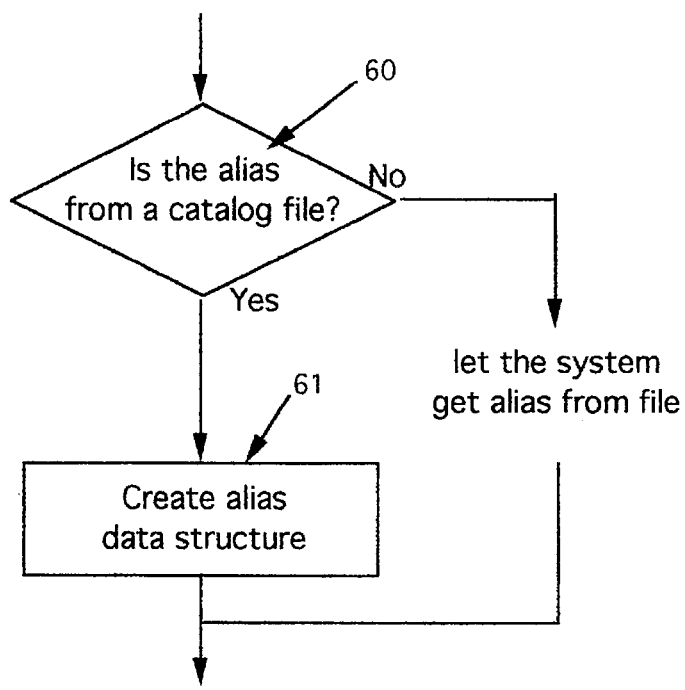
FIG. 6 is a flow diagram showing the operations that take place when an "alias" (pointer file data structure) is accessed.

FIG. 6 shows the steps that take place whenever a "GetIndResource" or "Get1IndResource" system call is made. Block 60 first determines if the request is for a 'alias' type resource stored within the last opened catalog file. If not, the code exits so the normal "GetIndResource" system call may proceed. If the requested alias is from within the catalog file, then the appropriate file alias data is recreated by block 61 and returned. The disk's alias information is first retrieved from the alias data stored within the (open) "root file". This is combined with the remembered file name and file id (from the last backup date) to form the needed alias data. This data is then returned to the system and used to prompt the user from the appropriate file.

In addition to the above operation, additional consideration is made for cataloging of application files. It is desired that the catalog entries for applications NOT be alias entries, but rather an actual application. This is desired so that the normal operation of the Macintosh™, which is to look for the application whenever a document is opened, will find a cataloged application entry in the catalog. In this embodiment, the catalog entry is also a zero byte file that results in common special code being executed. In this case, the steps outlined in FIG. 5 are followed. The result of opening the catalog entry is that the "root file" is opened. The root file contains application code that looks up and executes the corresponding application from the cataloged disk. In this embodiment, the catalog application attempts to open the matching "alias" data structure. This gets performed by the mechanism described above for FIG. 6. The alias data structure is then used to prompt the user for the original disk, and once inserted, program execution as passed on, using the standard Macintosh™ system "Launch" instruction.

Under he present invention, the catalog volume is a separate volume from the user's normal disk volume. This is because the catalog may easily contains tens of thousands to hundreds of thousands of file entries. Placing all these entries on the normal disk volume will end up in slowing down many of the day today file system operations because both the normal disk volume and the catalog entries will have to be searched or changed whenever a normal disk command is executed. With the catalog stored in a separate volume, then the catalog entries will only be searched of modified whenever a catalog search or modification is performed. The separate catalog volume is not an inconvenience during normal search command, however, since the system search command will automatically examine all available volumes.

As with all cataloging programs, a file is created on the users normal disk volume to hold the catalog information. Normally, a separate program must be executed to access this data base. Under the present invention, however, a standard system driver is provided that translates read/write requests directed to the catalog volume to access addresses within the catalog file. In this way, a normal data file may be used to store a separate file system data structure. Because of the presence of the driver, the mounted file volume appears to the user in a manner identical to other disk volumes.

Table 1 lists the details of the data structures that are created ancl stored as part of the preferred embodiment of this invention as described above. Each structure contains a collection of variables that are stored within specific files as specified within the table.

TABLE 1

DATA STRUCTURES:

```
/*    The following is the structure used in the Macintosh ™
      to implement an 'alias'. The fields named from
      "id" to "file" inclusive are identical for all files
      on a single volume. This portion of the alias
      data structure is stored in the Root File. The
      remaining fields "fid" to "creator" inclusive can be
      filled in using the numbers stored in the files
      directory entry.
*/
typedef struct
{
      short    type;       // internal to operating system
      short    length;     // internal to operating system
```

TABLE 1-continued

DATA STRUCTURES:

```
        uchar   data[32];       // internal to operating system
        } subAlias;
tyepdef struct
        {
        long    id;             // use to identify creator
        short   size;           // total size of alias
        short   pad1,pad2;
        uchar   askfor[28];     // prompt string to insert media
        ulong   vcreated;       // creation date of volume
        short   fsid;
        short   w4;
        long    parent;         // id of parant folder(directory)
        uchar   file[64];       // name of file
        long    fid;            // unique file id of actual file
        ulong   created;        // creation date of file
        long    type;           // file type
        long    creator;        // file creator
        long    pad3[5];
        subAlias field;
        } myAlias;
/*      A single invisible "data base" file is created to
        hold information about each volume cataloged. This
        file begins with DBHdr structure that describes the
        data base file itself.
*/
typedef struct
{
        short   dbVersion;      // version of data base structure
        short   dbAvail;        // total entries available within db file
        short   dbUsed;         // total entries currently in db file
        short   dbIndex;        // next unique disk id to be assigned
        ulong   dbCCrDate;      // creation date of data base file
        ulong   dbCLsMod;       // last modified date of data base
        long    dbDefDirID;     // directory to place new entries
        long    dbExtra;        // unused
        } DBHdr;
/*      Following the header, the data base file contains
        a DBEntry for each volume cataloged. This is used
        to quickly determine if a volume being unmounted has
        already been cataloged, and if so, how to find the
        folder containing that volumes catalog entries.
*/
typedef struct
        {
        ulong   dbVCrDate;      // volume creation date
        ulong   dbDirID;        // folder ID of entries top folder
        short   dbIndex;        // unique ID of this entry
        } DBEntry;
/*      For each volume cataloged, additional information
        about that volume is stored in a DBInfo data structure.
        This structure is stored as a Resource within the
        "Root File" of each volume cataloged.
*/
typedef struct
        {
        ushort  dbIndex;        // unique ID of this entry
        uchar   dbMode, dbSpair; // cataloging mode
        long    dbVFlDrCnt;     // count of files/folders on disk
        long    dbVNxtCNID;     // next unique file id to use
        long    dbIdent;        // extra identifier field (Ticks)
        ulong   dbVCrDate;      // volume creation date
        long    dbInDisk;       // total bytes stored on disk
        long    dbAvail;        // total bytes free
        uchar   dbName[32];     // name of disk
        long    dbSrcID;        // directory id of top folder
        short   dbNumLevels;    // count of available levels
        uchar   dbLevels[16];   // cataloging folder levels
        } DBInfo;
/*      The disks unique ID (index) is stored on the disk
        (if the disk is not write protected). This is
        stored in the 3rd sector, which contains the header
        information about the volume. It is stored at unused
        locations corresponding to an offset of 244 bytes and
        256 bytes from the start of that sector. It is deemed
        unlikely that both these locations will ever by used
        by another program.
*/
```

TABLE 1-continued

DATA STRUCTURES:

```
typdef struct
    {
    long    dbMagic;    // use to validate entry ('RDGB')
    long    dbIdent;    // extra identifier field (Ticks)
    long    dbIndex;    // unique ID of this entry
    } DBStamp;
```

It will be obvious to those having skill in the art that many changes may be made to the details of the above described preferred embodiment of the present invention without departing from the underlying principles thereof. The scope of the present invention should be determined, therefore, only by the following claims.

We claim:

1. A method of cataloging off-line media, the method comprising the steps:

providing a computer system, the computer system including a programmable processing element and disk drive storage device, the processing element executing operating system programming including a removable media unmount procedure and a file access procedure;

modifying said unmount procedure relative to a normal operating system programming to reference a catalog of off-line media stored on said hard disk by comparing identification and status indicia of a media to be removed with entries in said catalog, wherein is modified said catalog when said identification and status indicia fail to match said catalog entries; and modifying said file access procedure to examine said catalog for an entry therein representing of a file to be accessed and it said entry is found therein prompt a user the computer system to mount a media indicated in said catalog entry.

\* \* \* \* \*